(12) United States Patent
Martin et al.

(10) Patent No.: US 12,531,148 B2
(45) Date of Patent: Jan. 20, 2026

(54) SYSTEMS AND METHODS FOR WORKLOAD MANAGEMENT

(71) Applicant: GE Precision Healthcare LLC, Waukesha, WI (US)

(72) Inventors: Kathleen Pursell Martin, Pinckney, MI (US); Gabriella Devine, Chicago, IL (US); Steven Devoe, Chicago, IL (US); Younan Fakhouri, Des Plaines, IL (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 1021 days.

(21) Appl. No.: 17/456,151

(22) Filed: Nov. 22, 2021

(65) Prior Publication Data

US 2023/0162843 A1   May 25, 2023

(51) Int. Cl.
*G16H 40/20* (2018.01)
*G06Q 10/0639* (2023.01)

(52) U.S. Cl.
CPC ....... *G16H 40/20* (2018.01); *G06Q 10/06393* (2013.01)

(58) Field of Classification Search
CPC ........ G16H 40/20; G16H 10/60; G16H 40/67; G06Q 10/06393
USPC ...................................................... 705/2–3
See application file for complete search history.

(56) References Cited

U.S. PATENT DOCUMENTS

| | | | | |
|---|---|---|---|---|
| 11,257,587 B1* | 2/2022 | D'Angelo | ............ | A61B 5/0022 |
| 11,348,679 B1* | 5/2022 | Perry | .................... | G06F 3/0484 |
| 2005/0075902 A1* | 4/2005 | Wager | .................... | G16H 40/20 |
| | | | | 705/2 |
| 2006/0287906 A1* | 12/2006 | McGillin | ......... | G06Q 10/06311 |
| | | | | 705/7.14 |
| 2009/0089080 A1 | 4/2009 | Meisel | | |

OTHER PUBLICATIONS

Agor et al., "Simulating triage of patients into an internal medicine department to validate the use of an optimization-based workload score," 2017 Winter Simulation Conference (WSC), Las Vegas, NV, USA, 2017, pp. 2881-2892, doi: 10.1109/WSC.2017.8248011. (Year: 2017).*

Cucolo et al., The qualitative dimension of Nursing workload: a measurement proposal. Rev Lat Am Enfermagem. Dec. 5, 2019;27:e3238. doi: 10.1590/1518-8345.3274.3238. PMID: 31826169; PMCID: PMC6896804. (Year: 2019).*

(Continued)

*Primary Examiner* — Joy Chng
(74) *Attorney, Agent, or Firm* — McCoy Russell LLP

(57) ABSTRACT

Systems and methods are provided for workload management in a healthcare setting. In one example, a method for determining a workload demand of a medical facility includes automatically determining a workload score for a care team including plurality of clinicians over a shift based on shift data and event data received from the medical facility, including calculating a cumulative workload over the shift based on the event data and a workload reduction over time based on the shift data, generating a graphical workload score tile including a visual representation of the workload score, arranging the graphical workload score tile in a workload graphical user interface (GUI), and displaying the GUI on a display device.

20 Claims, 10 Drawing Sheets

(56) References Cited

OTHER PUBLICATIONS

International Application No. PCT/US2022/050286 filed Nov. 17, 2022—International Search Report and Written Opinion issued on Mar. 29, 2023; 15 pages.
EP application 22896482.1 filed May 1, 2024—extended Search Report issued Sep. 9, 2025; 12 pages.

* cited by examiner

SYSTEMS AND METHODS FOR WORKLOAD MANAGEMENT

FIELD

Embodiments of the subject matter disclosed herein relate to workload management in medical units, specifically with respect to the use of computerized tools for displaying current and predicted workload demands.

BACKGROUND

Acute care of patients in a hospital or other medical facility may be provided by many different clinicians that are expected to contribute varying amounts of time to one or more patients in the hospital. Hospitals may maintain a certain clinician staffing level to care for an expected number of patients for a given day or week. However, clinician staffing may be stretched thin or even become unavailable if an unexpected number of patients are admitted to the hospital, or if an unexpected number of complex patients are admitted to the hospital.

BRIEF DESCRIPTION

In one embodiment, a method for determining a workload demand of a medical facility includes automatically determining a workload score for a care team including plurality of clinicians over a shift based on shift data and event data received from the medical facility, including calculating a cumulative workload over the shift based on the event data and a workload reduction over time based on the shift data, generating a graphical workload score tile including a visual representation of the workload score, arranging the graphical workload score tile in a workload graphical user interface (GUI), and displaying the GUI on a display device.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
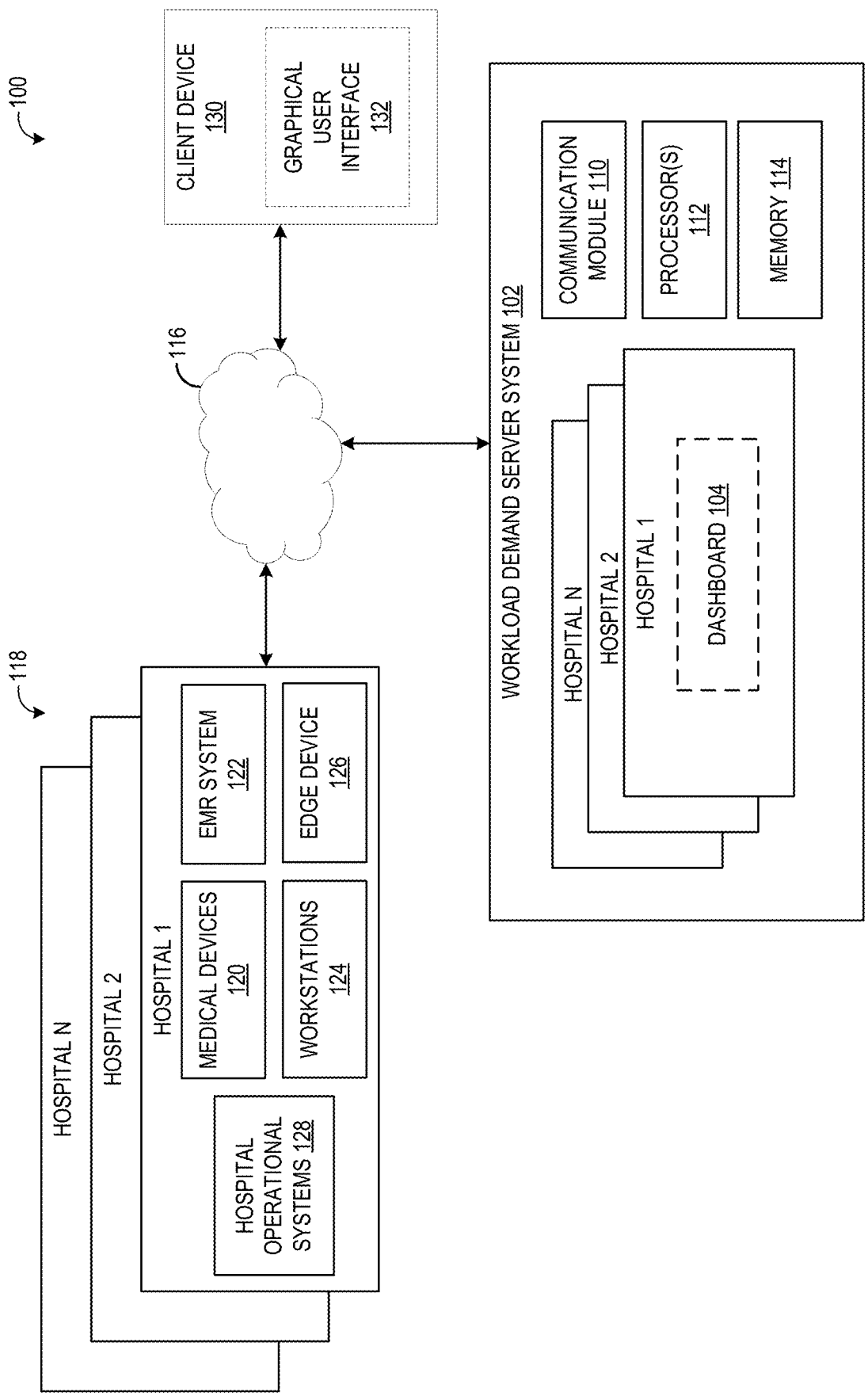
FIG. 1 schematically shows an example workload management system.

Healthcare facilities, such as hospital units, may be staffed (e.g., with clinicians such as physicians and nurses as well as various support staff) to handle an expected amount of patients, based on current patient census numbers in the hospital unit and historic trends (e.g., an expected increase in patients during the winter flu season relative to other times of the year). However, certain situations such as infectious disease outbreaks may strain healthcare systems, often demanding more clinicians than facilities are staffed to provide. Thus, clinician workloads may become strained as clinicians handle additional patients and/or work longer hours to continue to provide care to all patients in the hospital unit. Such strains on clinician workloads may lead to clinician burnout and compromise patient care. Further, many hospital units are unable to dynamically determine workload demands in real time, beyond predicting staffing needs based on a current number of patients, as predicting workload demands may require an assessment of not only the number of patients currently being treated in the hospital unit, but also the care demands of each patient, how much staff time each patient may require, potential discharges and admissions, and myriad other factors that may make manual workload demand determinations difficult or impossible. As a result, hospital units may be understaffed on certain days and overstaffed on other days and staffing levels may not be adjusted quickly enough to meet demand or allow sufficient clinician rest time.

Thus, according to embodiments disclosed herein, data regarding workload-impacting events may be collected from one or more medical facilities and used to populate a workload model based on current facility clinician staffing and scheduling in order to generate current and predicted workload demands for a care team, floor unit, hospital unit, and/or entire medical facility, in real-time or near real-time. The current and predicted workload demand may be visualized via one or more graphical user interfaces that may indicate clinician workload demands over time by care team, unit, and/or hospital. The workload demand may be updated automatically as workload-impacting events change and/or as clinician staffing changes. In doing so, healthcare authorities may be apprised of workload demands relative to staffing levels across care teams and hospital units, which may enable the healthcare authorities to make informed decisions about staffing levels (e.g., when to bring in additional staff or send staff home, when to transfer staff from one unit to another) and/or patient levels (e.g., when to transfer patients from one unit to another), via one or more graphical user interfaces that may present a limited set of information (e.g., clinician workload demands over time) to the users/healthcare authorities, which may also include links to additional information about the patients being treated, how the workflow demands were calculated, and so forth. In this way, the users' interaction with the available data may be made more efficient, as users are not forced to sift through multiple separate data feeds, data files, etc., to identify and then aggregate the information needed to determine workload demands.

FIG. 1 schematically shows an example workload management system 100 that may be implemented across multiple medical facilities such as hospitals. Workload management system 100 may include a workload demand server system 102. Server system 102 may include resources (e.g., memory 114, processor(s) 112) that may be allocated to store and execute one or more resource dashboards. For example, as shown in FIG. 1, a dashboard 104 is stored on server system 102 for a first hospital (hospital 1); a plurality of additional dashboards may be stored on server system 102, each corresponding to a respective hospital (hospital 2 up to hospital N).

As will be explained in more detail below, each dashboard may indicate workload demands for one or more care teams and/or units for each hospital. For example, each dashboard may track, for a corresponding hospital, the total number of hospital beds, total occupied hospital beds, total and occupied hospital beds by bed type (e.g., ICU, progressive care unit, observational care, negative pressure, etc.), and staffing levels for one or more types of clinicians in a daily or shift-wise fashion. When requested, the dashboards may be output for display on a display device as one or more graphical user interfaces, as described below. As used herein, a dashboard may include data on workload demand for a care team, a unit, a hospital, or a hospital network. The dashboard may include data that may be rendered as one or more of the graphical user interfaces that will be described in more detail below. The dashboards may not have any specific visual appearance and may include the data aggregated from one or more hospitals that is updated as new data is received.

The server system 102 may be communicatively coupled to a plurality of hospitals 118 via a network 116, from a first hospital (hospital 1), a second hospital (hospital 2), and on up to an Nth hospital (hospital N). Each hospital may be configured to send workload information to the server system 102. The workload information may include the information that is tracked via the dashboards described above, such as staffing levels/schedules and patient census.

In order to collect and send the workload information to the server system 102, each hospital may include various systems and devices to track, in real-time, staffing schedules (e.g., how many of each of one or more types of clinicians are scheduled to work each day/shift), patient admission, patient bed assignment, medical device deployment, patient condition information (e.g., diagnosed patient conditions, suspected patient conditions, patient lab results, etc.), and so forth, and send the tracked information to the server system 102. FIG. 1 shows an example of hospital systems and devices for the first hospital that may be used to collect workload information, send the collected workload information to the server system 102, and/or view one or more dashboards generated by server system 102. It should be appreciated that the hospital systems and devices described herein are exemplary, and that other systems and/or devices may be used to collect and send the workload information without departing from the scope of this disclosure. Further, while hospitals are described herein, other medical facilities may send workload information to the server system 102, such as outpatient clinics.

Hospital 1 may include a hospital operational systems 128. The hospital operational systems 128 may store and/or control a variety of hospital-, care provider-, and patient-related information, including but not limited to patient admission information (including date of admission and location of the patient within the medical facility), medical device information (e.g., total number of each type of medical device, current status of each medical device, etc.), patient care protocols and workflows, and staffing information including which clinicians are scheduled to work at any given point in time, which clinicians are monitoring/treating which patients, etc. Further, the hospital operational systems 128 may be communicatively coupled to a plurality of medical devices 120, an electronic medical records (EMR) system 122 (described in more detail below), and one or more workstations 124.

The medical devices 120 may include medical devices configured to monitor and/or provide medical treatment to respective patients, such as ventilators, anesthesia machines, infusion pumps, pulse oximeters, heart rate monitors, blood glucose monitors, ECGs, etc., as well as microphones, cameras, and other devices. The medical devices 120 may send output to the hospital operational systems 128 and/or EMR system 122. Further, in some examples, hospital operational systems 128 and/or EMR system 122 may receive diagnostic imaging information obtained from one or more imaging modalities, such as ultrasound, CAT, MRI, X-ray, etc. Based on the information output from the medical devices 120 as well as input from one or more clinicians, the current status of each patient may be tracked by the hospital operational systems 128 and/or EMR system 122.

The hospital operational systems 128 may track hospital bed usage. For example, when a patient is admitted, the hospital operational systems 128 may associate the patient with an identifier (e.g., an identification code such as a medical record number) and track patient status, patient ward/unit assignment, patient bed assignment, and so forth. The hospital operational systems 128 may also track diagnosed and/or suspected patient condition(s). For example, hospital operational systems 128 may receive lab results from a laboratory service and update diagnosed patient condition(s) in response to the received lab results and/or information provided by the care provider(s) of each patient. In some examples, EMR system 122 may additionally or alternatively track diagnosed and/or suspected patient conditions based on information provided by providers, lab results, and/or other information.

EMR system 122 may include or be communicatively coupled to an EMR database that stores electronic medical records for a plurality of patients. An EMR for a patient may include measured or inferred patient monitoring parameters (e.g., vital signs such as heart rate, respiration rate, etc.), lab results, diagnosed conditions, scheduled procedures, patient demographic information, family medical history, past medical history, lifestyle information, preexisting medical conditions, current medications, allergies, surgical history, past medical screenings and procedures, past hospitalizations and visits, etc. The EMR database may be a database stored in a mass storage device configured to communicate with secure channels (e.g., HTTPS and TLS), and store data in encrypted form. Further, the EMR system 122 is configured to control access to patient electronic medical records such that only authorized healthcare providers may edit and access the electronic medical records.

Hospital 1 further includes one or more workstations 124. Each workstation may include a processor, memory, communication module, user input device, display (e.g., screen or monitor), and/or other subsystems and may be in the form of a desktop computing device, a laptop computing device, a tablet, a smart phone, or other device. The workstations may be located locally at the hospital (such as part of hospital administration) and/or remotely from the hospital (such as a user's mobile device).

The hospital operational system 128, medical devices 120, EMR system 122, and workstations 124 may communicate with each other via a hospital network, which may be a suitable wired and/or wireless network. Communication between the systems/devices of hospital 1 and server system 102 may be provided by a suitable device, herein an edge device 126. Edge device 126 may exemplarily be an edge processing device, cloud processing device, or internet gateway. The edge device 126 may facilitate a secure communications link between the systems/devices communicating on the hospital network with the servers, processors, and computer readable media implementing the server system 102.

Server system 102 includes a communication module 110, memory 114, and processor(s) 112 to generate and store the dashboards described herein. Communication module 110 facilitates transmission of electronic data within and/or among one or more systems. Communication via communication module 110 can be implemented using one or more protocols. In some examples, communication via communication module 110 occurs according to one or more standards (e.g., Digital Imaging and Communications in Medicine (DICOM), Health Level Seven (HL7), ANSI X12N, etc.). Communication module 110 can be a wired interface (e.g., a data bus, a Universal Serial Bus (USB) connection, etc.) and/or a wireless interface (e.g., radio frequency, infrared, near field communication (NFC), etc.). For example, communication module 110 may communicate via wired local area network (LAN), wireless LAN, wide area network (WAN), etc. using any past, present, or future communication protocol (e.g., BLUETOOTH™, USB 2.0, USB 3.0, etc.).

Memory 114 includes one or more data storage structures, such as optical memory devices, magnetic memory devices, or solid-state memory devices, for storing programs and routines executed by processor(s) 112 to carry out various functionalities disclosed herein. Memory 114 may include any desired type of volatile and/or non-volatile memory such as, for example, static random access memory (SRAM), dynamic random access memory (DRAM), flash memory, read-only memory (ROM), etc. Processor(s) 112 may be any suitable processor, processing unit, or microprocessor, for example. Processor(s) 112 may be a multi-processor system, and, thus, may include one or more additional processors that are identical or similar to each other and that are communicatively coupled via an interconnection bus.

As used herein, the terms "sensor," "system," "unit," or "module" may include a hardware and/or software system that operates to perform one or more functions. For example, a sensor, module, unit, or system may include a computer processor, controller, or other logic-based device that performs operations based on instructions stored on a tangible and non-transitory computer readable storage medium, such as a computer memory. Alternatively, a sensor, module, unit, or system may include a hard-wired device that performs operations based on hard-wired logic of the device. Various modules or units shown in the attached figures may represent the hardware that operates based on software or hard-wired instructions, the software that directs hardware to perform the operations, or a combination thereof.

"Systems," "units," "sensors," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

One or more of the devices described herein may be implemented over a cloud or other computer network. For example, server system 102 is shown in FIG. 1 as constituting a single entity, but it is to be understood that server system 102 may be distributed across multiple devices, such as across multiple servers.

Workload management system 100 may likewise include a client device 130, including a display on which a user may view data from the workload management system. For example, data from dashboard 104 may be displayed on client device 13088888888888888888888888888888888 8888888 888888888888888888 as a graphical user interface 132, allowing a user to view workload demand at a given hospital N. Graphical user interface 132 may also allow a user to further interact with the data included on a dashboard, as shown in FIGS. 6-10.

Client device 130 may include user input devices, memory, processors, and communication modules/interfaces similar to communication module 110, memory 114, and processor(s) 112 described above, and thus the description of communication module 110, memory 114, and processor(s) 112 likewise applies to the other devices described herein. The user input devices may include keyboards, mice, touch screens, microphones, or other suitable devices.

As an example, the client device may store one or more graphical user interface templates in memory that include placeholders for relevant information stored on server system 102. For example, client device 130 may include graphical user interface 132, comprising a template for a resource dashboard that a user of the client device may configure with placeholders for desired patient information. When the graphical user interface is displayed on the client device, the relevant information may be retrieved from server system 102 (e.g., from a dashboard) and inserted in the placeholders. In other examples, server system 102 may render selected dashboards into the graphical user interfaces described herein, and may send the graphical user interfaces for display on a display device (e.g., of client device 130) when requested.

As will be explained in more detail below, each hospital or other medical facility may be configured to send data to server system 102 so that workload demand across care teams, hospital units, hospitals, and/or hospital networks may be tracked and each team or unit's workload demand may be visualized through one or more workload demand graphical user interfaces, as described below. The workload demands may be updated in real-time or near real-time as data is received from each hospital. As used herein, real-time may include the data being sent as soon as the data is collected, immediately and without an intentional delay. In this way, as soon as a hospital has workload demand information available (e.g., a patient is admitted to a particular bed at the hospital), that workload demand information is sent to the server system. As used herein, near real-time may refer to the data being sent periodically from the hospital to the server system to allow for data aggregation, data filtering, and/or other data processing actions. However, the near-real time transmission of the data may still be rapid relative to when the data was made available, such as data being transmitted within 1-5 minutes of being made available (e.g., rather than as soon as the data is available).

While FIG. 1 shows a server system communicatively coupled to a plurality of hospitals, in some examples, the server system may only receive information from a single hospital or medical facility. In such examples, the server system may be located remotely from the hospital or the server system may be included as part of the hospital and thus may communicate with the EMR system and/or other components of the hospital via the hospital network.

Figure 2:
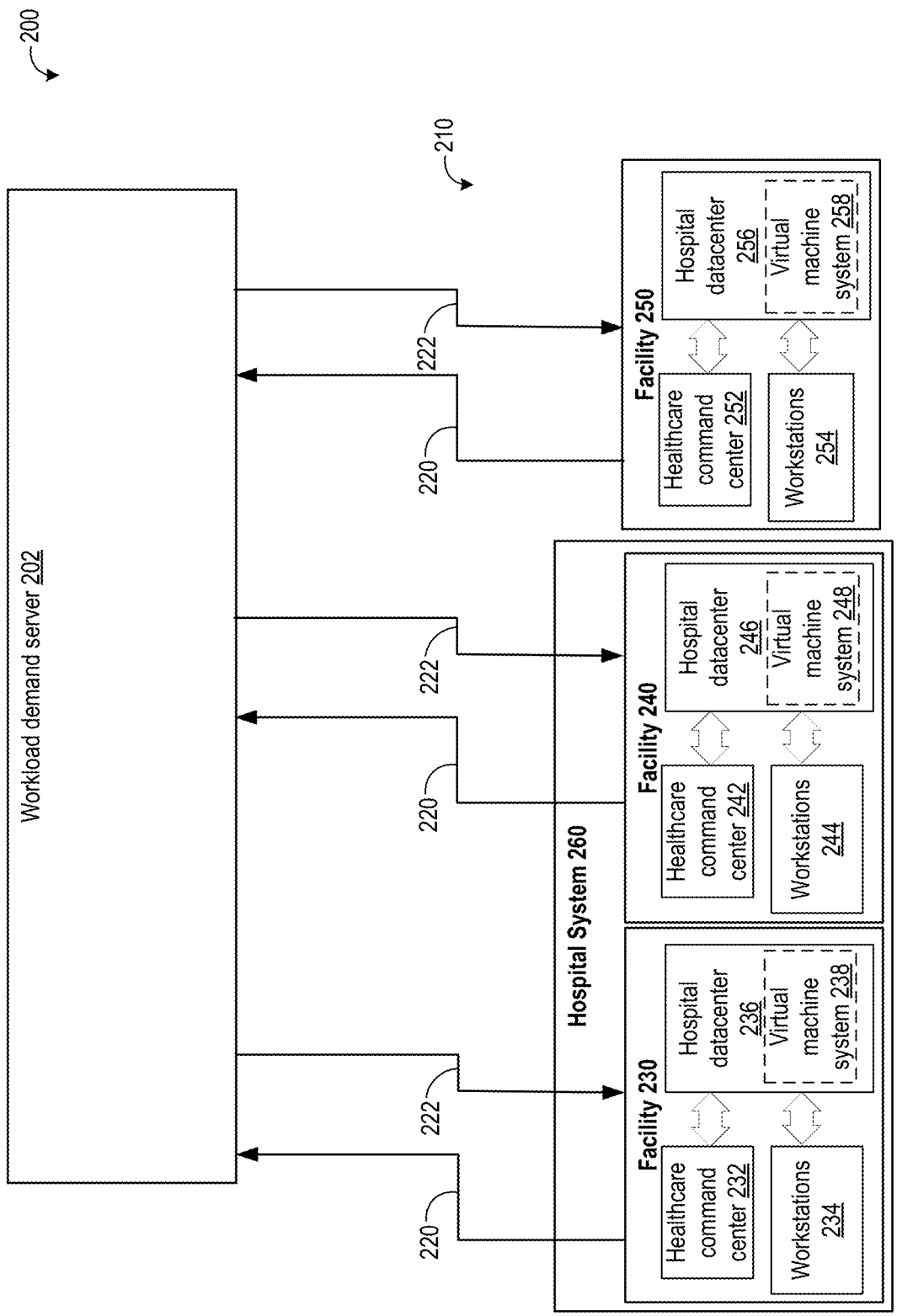
FIG. 2 schematically shows another example workload management system.

FIG. 2 shows another example workload management system 200 that may be implemented across various healthcare facilities (e.g., hospitals) and hospital systems. The workload management system 200 includes a workload demand server 202 including a plurality of modules for receiving a plurality of data feeds from plurality of facilities, evaluating staff workload demands in real-time or near real-time at each of the facilities, and generating a plurality of graphical user interface tiles that may be configured based on one or more of user query, data feed received from the facility and facility type. The workload demand server 202 may be similar to workload demand server system 102, and thus may include similar components in addition to the modules described here at FIG. 2, including communication module 110, processor 112, and non-transitory memory 114.

The workload management system 200 is shown including a hospital system 260 including a facility 230 and a facility 240, and a facility 250 not associated with the hospital system 260. It will be appreciated that the workload management system may include a plurality of hospital systems and/or plurality of facilities. The hospital system 260 may include fewer or more facilities than shown in FIG. 2.

Each of the facilities 230, 240, and 250 may include respective healthcare command centers 232, 242, and 250 for coordinating patient care and resources within the respective facility and/or across the respective hospital system. Each of the facilities 230, 240, and 250 further include respective data processing centers 236, 246, and 256 for performing various data-related operations, including collecting, storing, processing, distributing and/or allowing access to large amounts of data. While the present example shows each facility including a data center, other configurations, such as the data center being situated outside the facility, are also possible. In some example, two or more facilities within a hospital system may share a data center. Further, data centers 236, 246, and 256 may be configured as on-premise data centers, cloud-based data centers, or combination thereof. Each of the facilities 230, 240, and 250 further include workstations 234, 244, and 254. Each facility may include a plurality of workstations. The workstations may be command center workstations, medical device workstations, or any other type of workstation used to access and/or update one or more of patient information and staffing information.

In one embodiment, as shown herein at FIG. 2, the hospital systems and facilities may form a part of a datasharing hospital network system 210. As such, hospital data centers 236, 246, and 256 may be provisioned to include respective virtual machine systems 238, 248, and 258 for obtaining a plurality of data from one or more of respective hospital data centers, command centers, and workstations, processing the received data, and transmitting the data to the workload demand server 202. Example data feeds from the virtual machine systems 238, 248, and 258 to the workload demand server 202 are indicated at 220. While the present example shows each facility configured with a virtual machine system, it will be appreciated that the virtual machine system may configured based on the location and type of the data centers of the respective facilities and hospital systems. The data feeds 220 from the facilities 230, 240, and 250, via the respective virtual machine systems 238, 248, and 258, to the resource utilization server 202 may be sent using an application programming interface (API) and/or may include at least some data sent according to HL7 protocols, though other types of feeds and protocols are also possible.

Further, the workload demand server 202 may deliver one or more workload demand dashboards, such as dashboard 104, to requesting workstations including display devices (e.g., command center workstations, medical device workstation, etc.) within the facilities and/or to any requesting client device, such as client devices described at FIG. 1. The communication of one or more workload demand dashboards from the workload demand server is indicated by 222. As indicated above, when requested, the dashboards may be output for display on a respective display device of the workstation via a graphical user interface (GUI), examples of which are shown in FIGS. 6-10.

The virtual machine systems 238, 248, and 258 may include plurality of virtual machines including one or more processing units and non-transitory memory. Further, the virtual machine systems may allow access to hospital data to authorized personnel via a secured connection, such as VPN. While the present example at FIG. 2 describes data transfer to the workload demand server 202 via virtual machines system provisioned within hospital data centers, other embodiments may perform the data transfer without implementing the virtual machines and the data from each of the facilities may be sent via one or more of workstations, command centers, client devices, and data centers.

In some embodiments, a workload demand server, such as the workload demand server 202 discussed with respect to FIG. 2 and the workload demand server system 102 discussed with respect to FIG. 1, may be implemented by a virtual machine system comprising a plurality of virtual machines, wherein the virtual machine system is provisioned within a datacenter of a healthcare facility. Each of the plurality of the virtual machines may be configured as computing systems including one or more processors and memory.

The data feeds 220 may be obtained from EMR data, which may be obtained from a hospital EMR database at the hospital data center (e.g., via EMR system 122), and/or from EMR workstation processing and storage systems having non-transitory memory. The data sent over the data feeds 220 may include staff scheduling data (e.g., how many of each of a plurality of different staff/clinicians are scheduled each shift), ADT data (which may include admissions, discharge and transfer data with or without personal patient information and demographic information), and other types of data (which may include scheduled/ordered procedures, patient vital signs, lab test results, patient medications, and other data). The ADT data and other types of data may be processed to determine minute-by-minute workload demands, as will be explained below.

Figure 3:
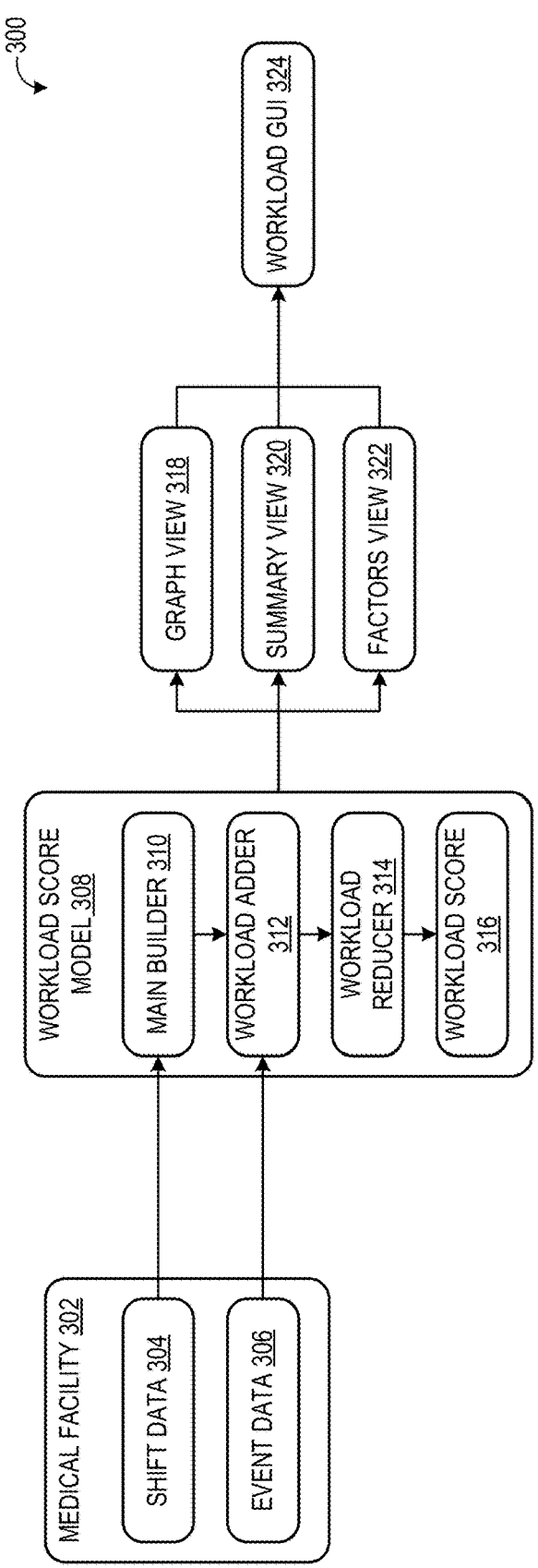
FIG. 3 schematically shows an example process for generating a workload graphical user interface (GUI) using a workload score model, as implemented in the example workload management system of FIG. 1 and/or FIG. 2.
Figure 3:
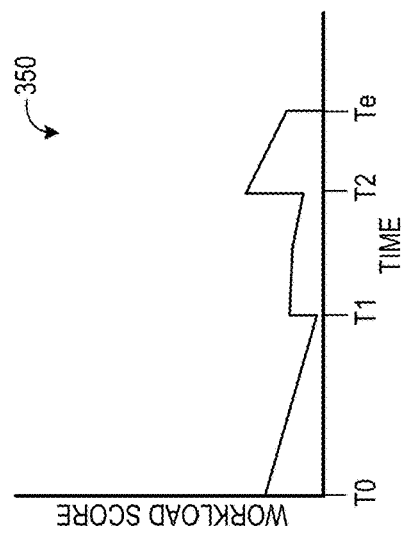
Figure 3:
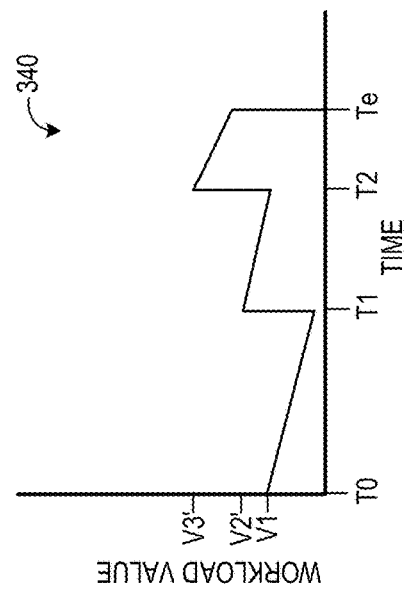
Figure 3:
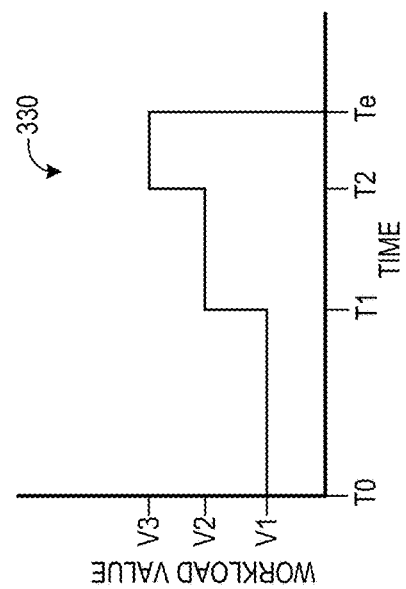

FIG. 3 is a block diagram schematically showing a process 300 for generating a workload graphical user interface (GUI) including a workload score for a selected medical facility. Process 300 includes information being sent from a medical facility 302 to a workload score model 308, which may be executed by a workload demand server, such as server system 102 of FIG. 1 and/or server 202 of FIG. 2. The information sent by the medical facility 302 may include shift data 304 and event data 306. The shift data 304 and event data 306 may include data obtained from a hospital operational systems (e.g., hospital operational systems 128 of FIG. 1) and/or data obtained from one or more electronic medical record systems (e.g., EMR system 122 of FIG. 1). The shift data 304 may include staff schedules for one or more clinicians of each of one or more care teams of the medical facility over one or more shifts. For example, the shift data 304 may include a start time and a stop time for each shift scheduled to occur over a 24-hour period, such as a first shift that begins at 7 AM and ends at 7 PM and a second shift that begins at 7 PM and ends at 7 AM the next day. The staff schedules may include the number of clinicians for each care team scheduled to work at each hour or minute of each shift. In some examples, the staff schedules may also include the types of clinicians in addition to the number of clinicians. For example, the staff schedules may indicate that three general physicians (e.g., hospitalists) and three critical care physicians (e.g., intensivists) for a given care team are scheduled to work from 7 AM to 7 PM. In another example, the staff schedules may indicate that three general physicians and three critical care physicians are scheduled to work from 7 AM to 3 PM and that three different general physicians and three different critical care physicians are scheduled to work from noon until 7 PM, and thus the staffing levels of the care team may change throughout the shift. A care team may include one or more clinicians of the medical facility that provide care to a group of patients. A given unit of the medical facility (e.g., an ICU, a medical-surgical unit, etc.) may have one or more care teams, at least in some examples.

The shift data 304 may be used by a main builder 310 of the workload score model 308. The main builder 310 may initialize an iteration of the workload score model with the shift data for each minute in each care team shift.

The data that is sent from the medical facility 302 further includes event data 306. The event data 306 may include data relating to events or other factors that impact a care team's workload. The event data 306 may be tagged with an identifier or otherwise be identifiable to segment the event data by care team, such that the event data may be used to determine the workload for each of one or more care teams at the medical facility. The event data 306 may include ADT data that includes the number of patients being treated by the care team at the start of the shift and any expected changes to the number of patients being treated by the care team during the shift (e.g., scheduled discharges or transfers). The event data 306 may further include information relating to a status of each patient being treated by the care team, which may be usable to assign an expected workload demand for each patient. For example, the patients may be classified as standard or complex based on the patient status, with complex patients being assigned a higher workload demand than standard patients. In some examples, the event data 306 may further include scheduled procedures for one or more patients being treated by the care team. The scheduled procedures may include procedures performed by the care team as well as procedures performed at a different site or by a different care team, such as a diagnostic imaging session. The scheduled procedures or other events may be identified based on a clinician entering an order to perform the procedure, which may be sent to the one or more EMR systems of the medical facility and sent as part of the event data 306.

Thus, the event data 306 may include events or factors predicted to occur during the shift that affects the workload of the care team. The events or factors may be associated with discrete amounts of time that each event or factor is expected to impose on the care team. For example, a scheduled procedure may be associated with a 30-minute workload demand, corresponding to a length of time the procedure is expected to take. Routine monitoring of a standard patient may be associated with a given length of time (e.g., 40 minutes of workload demand) while monitoring of a complex patient may be associated with a different length of time (e.g., one hour of workload demand). While patient monitoring events may be spread out over the course of the shift, events or factors that include or are associated with a scheduled procedure may include lengths of time that only occur at discrete time points, which may also be indicated by the event data 306.

The event data 306 may be used by a workload adder 312 of the workload score model 308. The workload adder 312 may generate an expected workload across the shift for the care team based on the event data 306. The workload adder 312 may add a respective amount of time associated with each event or factor in the event data to a running workload calculator. As an example, the event data 306 may include a patient census for the care team at the start of the shift, and the workload adder may associate a respective length of time for routine monitoring of each patient over the shift. The workload adder may sum those lengths of time and populate the running workload calculator, starting at the beginning of the shift, with the sum of the lengths of time and extend that time/workload across the entire shift. The event data may also include a procedure scheduled to begin four hours into the shift and the workload adder may associate that procedure a second length of time, and the workload adder may add the second length of time to the running workload calculator, starting at four hours into the shift and extending until the end of the shift. In this way, for each factor or event in the event data 306, the workload adder may add that event's workload (e.g., in minutes) to the running workload calculator at the event time and every point onwards in the shift. In some examples, the workload adder 312 may access a look-up table stored in memory to determine the length of time to associate with each event. In other examples, the length of time associated with each event may be included in the event data.

FIG. 3 includes an example plot 330 of a running workload calculator for a shift of an example care team as calculated by the workload adder 312. The plot 330 shows workload value (which may be in minutes) plotted as a function of time. Time starts at zero, corresponding to the beginning of the shift, and extends along the x-axis until the end of the shift, indicated at Te on the x-axis. At T0, the beginning of the shift, a first workload value V1 is added, which may correspond to the expected workload for the patients at the start of the shift. This expected workload may include tasks to be performed throughout the shift, e.g., unscheduled tasks, routine monitoring, etc. At a later point in time, T1, additional work is added to the expected workload, bringing the workload value to a second value, V2. For example, a procedure may be scheduled to begin at T1, or a new patient may be expected to be admitted at T1. Similarly, at T2 additional work is added to the expected workload, bringing the workload value to a third value, V3. Thus, each additional workload value (e.g., in minutes) is added to the care team workload in a cumulative manner, such that by the end of the shift, the workload value represents the entire (e.g., cumulative) workload over the whole shift. Further, in some examples, the workload values over time may be calculated based on information received at discrete and non-real time points in time (e.g., event data may be received only at the beginning of the shift, at the beginning of the shift and every hour afterward, etc.). In other examples, the workload values over time may be calculated based on information received in real-time or near real-time, e.g., event data may be updated in real time as events are added or changed, and any updates to the event data are sent to the workload adder as soon as the event data is updated.

The workload score model 308 further includes a workload reducer 314. The workload reducer may determine a running calculation of how much work the care team is expected to accomplish across the shift, based on the shift data 304, for example. The workload reducer may calculate that the care team can accomplish a given workload value over a given amount of time based on the number of clinicians working and/or the types of clinicians working, as different clinician types (e.g., hospitalists versus intensivists) may be expected to accomplish different amounts of work. Thus, the workload reducer 314 may, for each data point, reduce the workload value by an amount of time that has elapsed in the shift and the care teams' work capacity. This work completed considers the number of team members staffed with their work capacity.

FIG. 3 includes an example plot 340 of a running work completed calculator for the shift of the care team described above with respect to plot 330, as calculated by the workload reducer 314. The plot 340 shows workload value (which may be in minutes) plotted as a function of time. Time starts at zero, corresponding to the beginning of the shift, and extends along the x-axis until the end of the shift, indicated at Te on the x-axis. At T0, the beginning of the shift, a first workload value V1 is added, which may correspond to the expected workload for the patients at the start of the shift, similar to the first workload value V1 of plot 330. The workload value then decreases over time, corresponding to the amount of work per minute the care team is expected to accomplish. At T1, because of the additional work added to the expected workload for the care team (e.g., as shown at plot 330), the workload value increases to a second value, V2'. The second workload value V2' is different (e.g., lower) than the second workload value V2 of plot 330, due to the work already accomplished by the care team prior to T1. From T1 to T2, the workload value again decreases based on the amount of work the care team is expected to accomplish (e.g., per minute). At T2, the workload value again increases to V3', based on the workload added at T2 (e.g., as shown in plot 330), and decreases from T2 until the end of the shift.

The amount the workload value decreases from T0 to T1, from T1 to T2, and from T2 to Te may be equal, e.g., the plot may decrease in value at the same rate across each time frame. However, in other examples, the amount of the workload value decreases may change over time due to changes in staffing (e.g., if a clinician stops working at T1, the plot may decrease in value at a slower rate after T1 than before T1).

The workload score model 308 may calculate a workload score 316 based on the output of the workload adder 312 and the workload reducer 314. The workload score may be calculated as the workload value (as determined by the workload reducer) divided by the time remaining in the shift. FIG. 3 further includes a plot 350 showing a workload score over time, calculated from the workload value over time shown in plot 340.

The information generated by the workload score model 308 may be assembled and formatted in various different views that may ultimately be displayed on a workload GUI 324. For example, as shown in FIG. 3, the output of the workload score model 308 may be assembled into a graph view 318, a summary view 320, or a factors view 322. The graph view 318 may include a plot of the workload score over time, such as the plot 350. The summary view 320 may include a value of the workload score at that moment in time (e.g., an instantaneous value). The factors view 322 may show graphs of the output of the workload adder 312, the workload reducer 314, and the workload score 316, or summary views of the output of the workload adder 312, the workload reducer 314, and the workload score 316.

Figure 4:
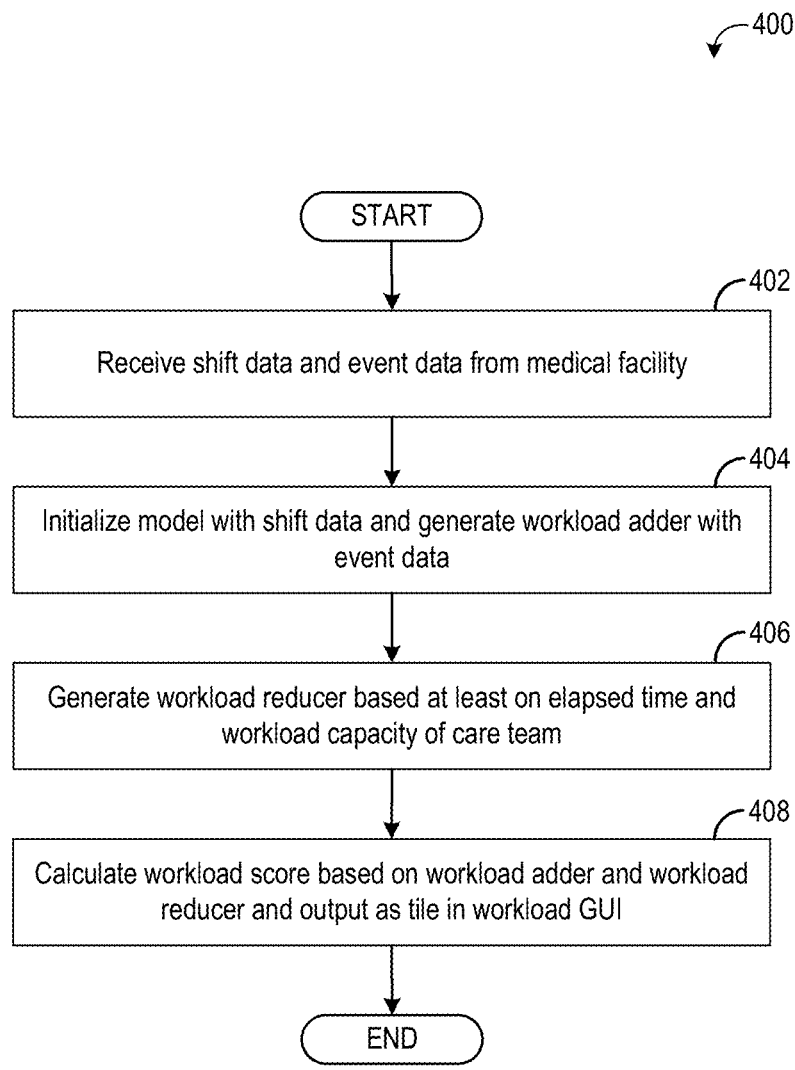
FIG. 4 is a flow chart illustrating a method for generating a workload score tile for display in a workload GUI, using the workload score model of FIG. 3.

Next, FIG. 4 shows a flowchart illustrating a method 400 for generating a workload score for display in a workload graphical user interface (GUI). Method 400 may be carried out according to instructions stored in memory of a computing device in communication with the one or more hospitals or medical facilities, such as workload demand server system 102 and/or workload demand server 202, an edge device connected to the workload demand server, or any appropriate combination thereof.

At 402, method 400 includes receiving shift data and event data from a medical facility. The shift data may include information on staffing for each of one or more care teams at the medical facility, such as the shift data 304 of FIG. 3. The event data may include information on workload-impacting events for each of the one or more care teams at the medical facility, such as the event data 306 of FIG. 3. At 404, a model (e.g., the workload score model 308) on the workload demand server may be initialized with the shift data for each care team and a workload adder may be generated for each care team with the event data. As a result, a running workload calculator showing expected workload demand across the shift for each care team may be formed, such as the plot 330 of FIG. 3. At 406, a workload reducer is generated for each care team based on an amount of elapsed time since the start of the shift and the workload capacity of each care team. As a result, the running workload calculator may be adjusted according to the amount of work the care team is expected to accomplish across the shift, to thereby form a running workload completed calculator, such as the plot 340 of FIG. 3. At 408, a workload score is calculated for each care team based on the workload adder, the workload reducer, and a time left in the shift. For example, the running workload completed calculator may be normalized based on the time left in the shift, which may highlight segments of time where workload demand is manageable by the care team (e.g., when the workload score is equal to or less than one) and segments of time where workload demand is not manageable by the care team (e.g., when the workload score is greater than one). The workload score may be output as a tile in a workload GUI, as shown in FIG. 6-10. Method 400 then ends.

Figure 5:
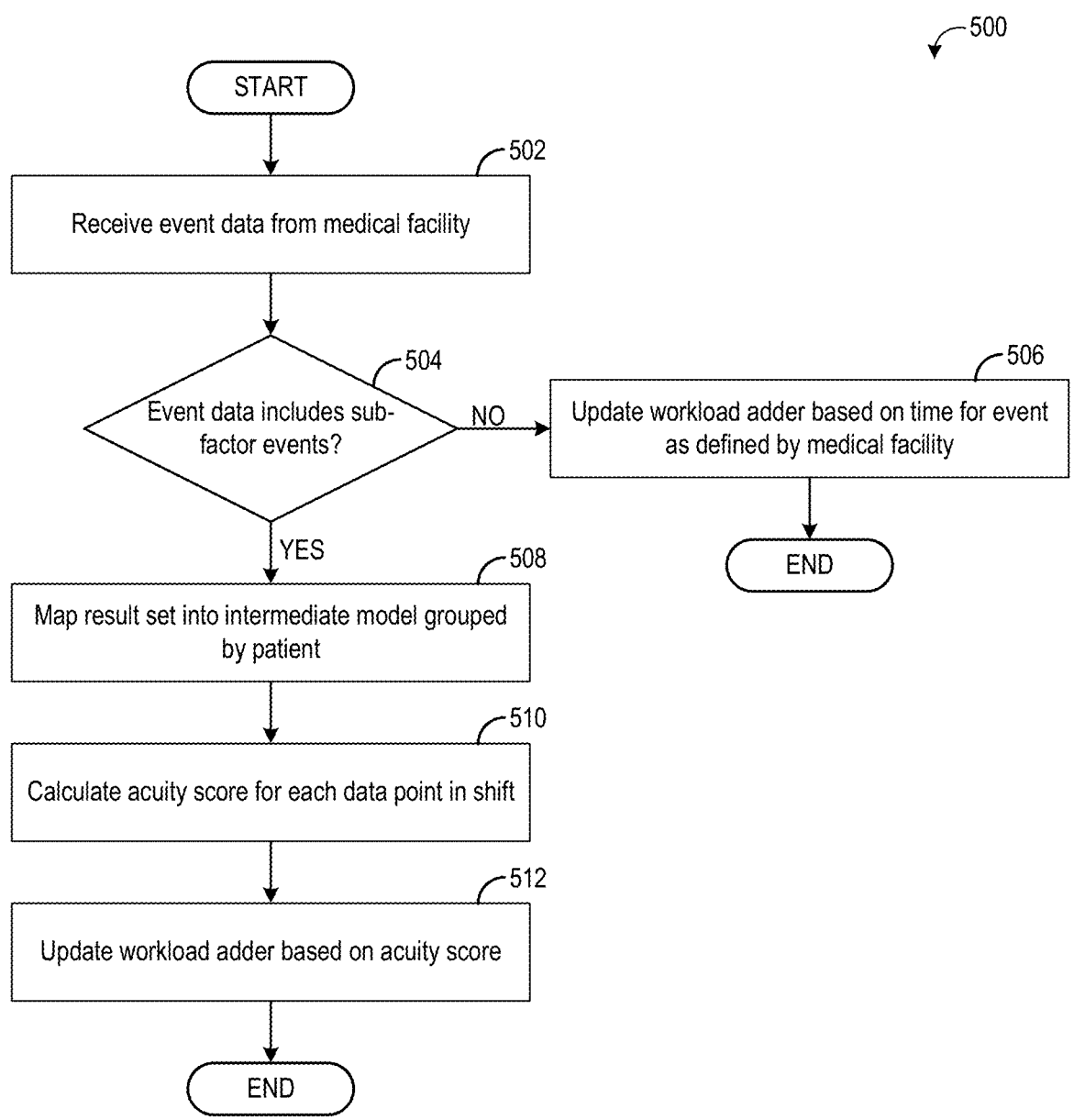
FIG. 5 is a flow chart illustrating a method for generating a clinician-specific workload adder for use in generating the workload score tile of FIG. 4.

Thus, method 400 depicts a method for calculating a workload score based on an expected workload for a care team over a shift and staffing levels of the care team over the shift. In the example presented in method 400, the expected workload for the care team may be estimated from event data provided by the medical facility, where the event data includes, for each of a plurality of events/factors, an amount of time that event is expected to take. This method may be applied for certain types of clinicians, such as hospitalists, such that for the factor events, the logic for detecting those events is implemented by the data source (e.g., the medical facility). In the case of other types of clinicians, such as intensivists, "sub-factor" events may be provided by the data source, then additional processing may be performed by the workload score model to detect the events for which workload should be added. An example of this process is shown in FIG. 5, which depicts a method 500 for generating clinician-specific workload adders. Method 500 may be carried out according to instructions stored in memory of a computing device in communication with the one or more hospitals or medical facilities, such as workload demand server system 102 and/or workload demand server 202, an edge device connected to the workload demand server, or any appropriate combination thereof. In some examples, method 500 may be executed in parallel with method 400 or as part of method 400, such as part of the workload adder that is generated at 404 of method 400.

At 502, event data is received from a medical facility. The event data may include information on workload-impacting events for each of the one or more care teams at the medical facility, such as the event data 306 of FIG. 3. At 504, method 500 determines if the event data includes any sub-factor events. The sub-factor events may be events that are relevant for calculating an acuity score, such as patient vital signs (e.g., heart rate, respiration rate, temperature), patient medication status, patient oxygen status, patient pain scores, and the like. If the event data does not include any sub-factor relevant events, method 500 proceeds to 506 to update the workload adder based on the time associated with each event, as defined by the medical facility (which may be the same process performed at 404 of method 400), and then method 500 ends.

If the event data includes any sub-factor events, method 500 proceeds to 508 to map the result set (e.g., all the received sub-factor events) into one or more intermediate models grouped by patient. For example, the workload score model may include a patient event history builder that generates a history of the sub-factor events relevant for the acuity score for each patient. The history may include a list of the acuity-relevant events grouped by patient. At 510, an acuity score is calculated for each data point in the shift. For example, the workload score model may include a patient acuity score builder that generates an acuity score at each point in time (e.g., each hour or another suitable frequency) for each patient based on the list of acuity-relevant events. The acuity score may be a qualitative score, such as low, medium, or high, or a scale of 1-4 (or another suitable acuity marker), that indicates whether the patient will demand a smaller (e.g., a low acuity score) or a higher (e.g., a high acuity score) workload. Along with the acuity score, the patient acuity score builder may output a previous acuity score (the prior calculated acuity score) and a time at which the acuity score may be generated next. Further, the patient acuity score builder may include an identifier of the care team that is providing care to the patient. At 512, the workload adder may be updated based on the acuity score for each patient being treated by the care team. Method 500 then ends.

Figure 6:
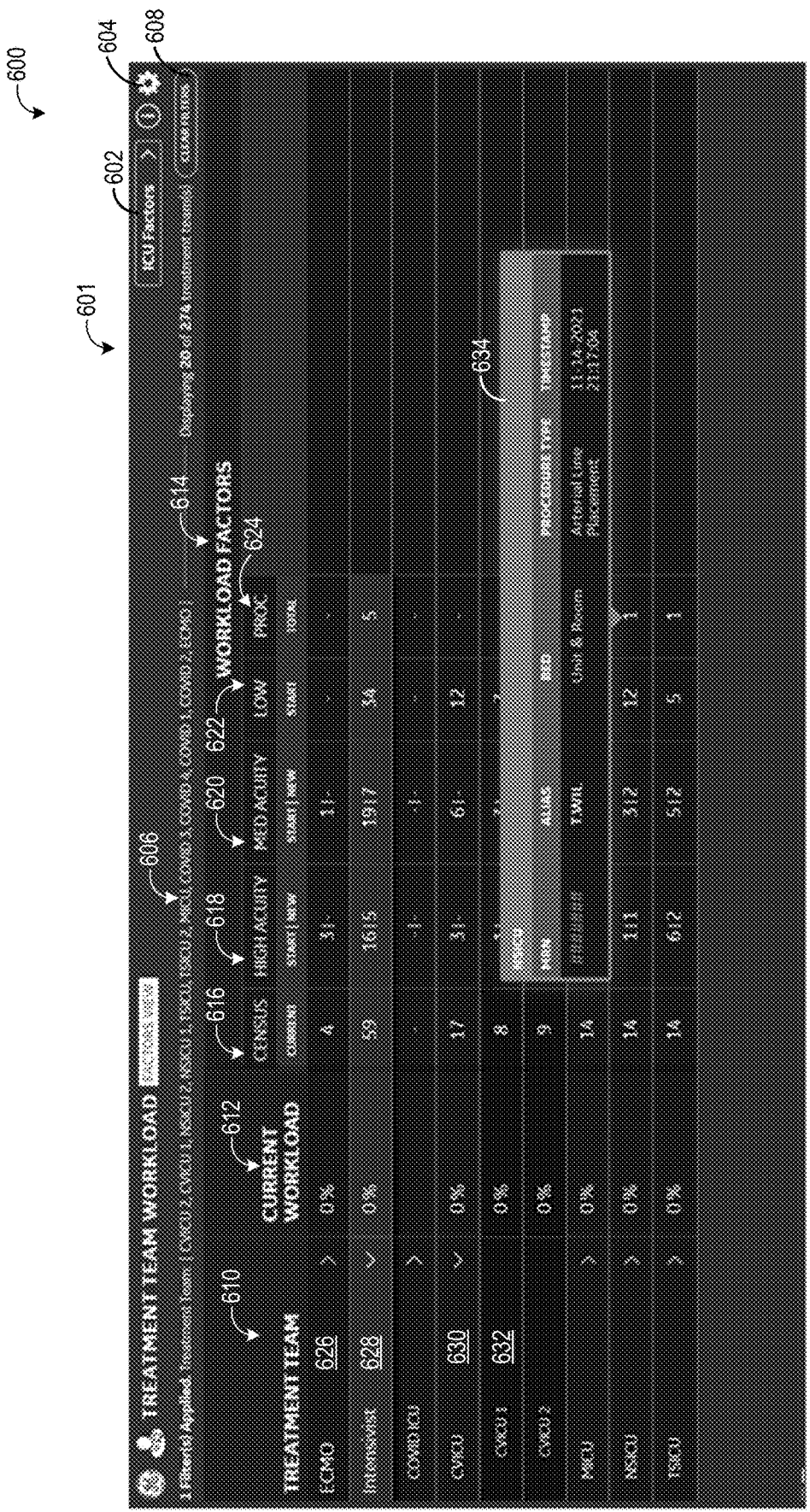
FIGS. 6-10 show example workload GUIs.
Figure 7:
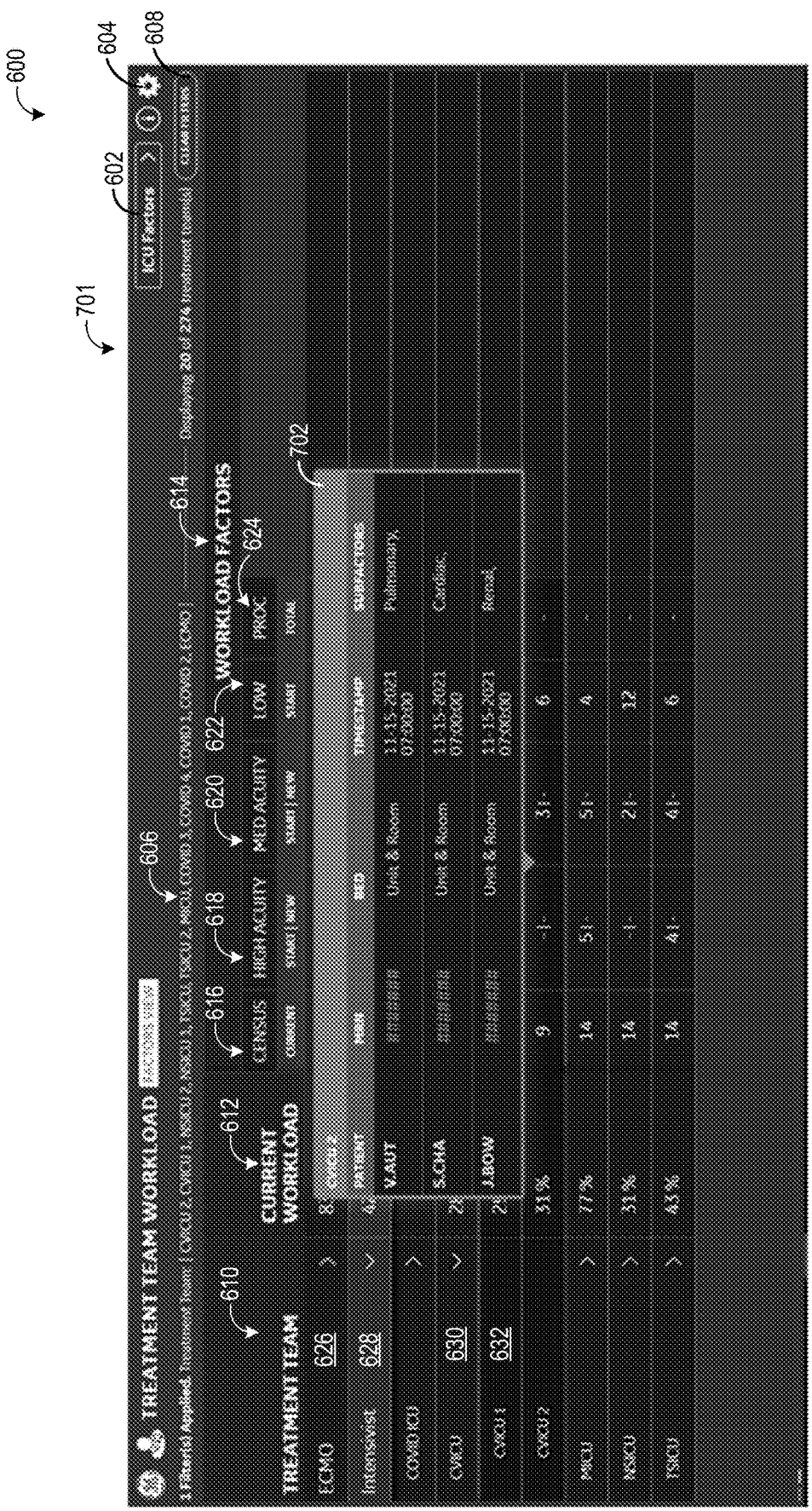
Figure 8:
Figure 9:
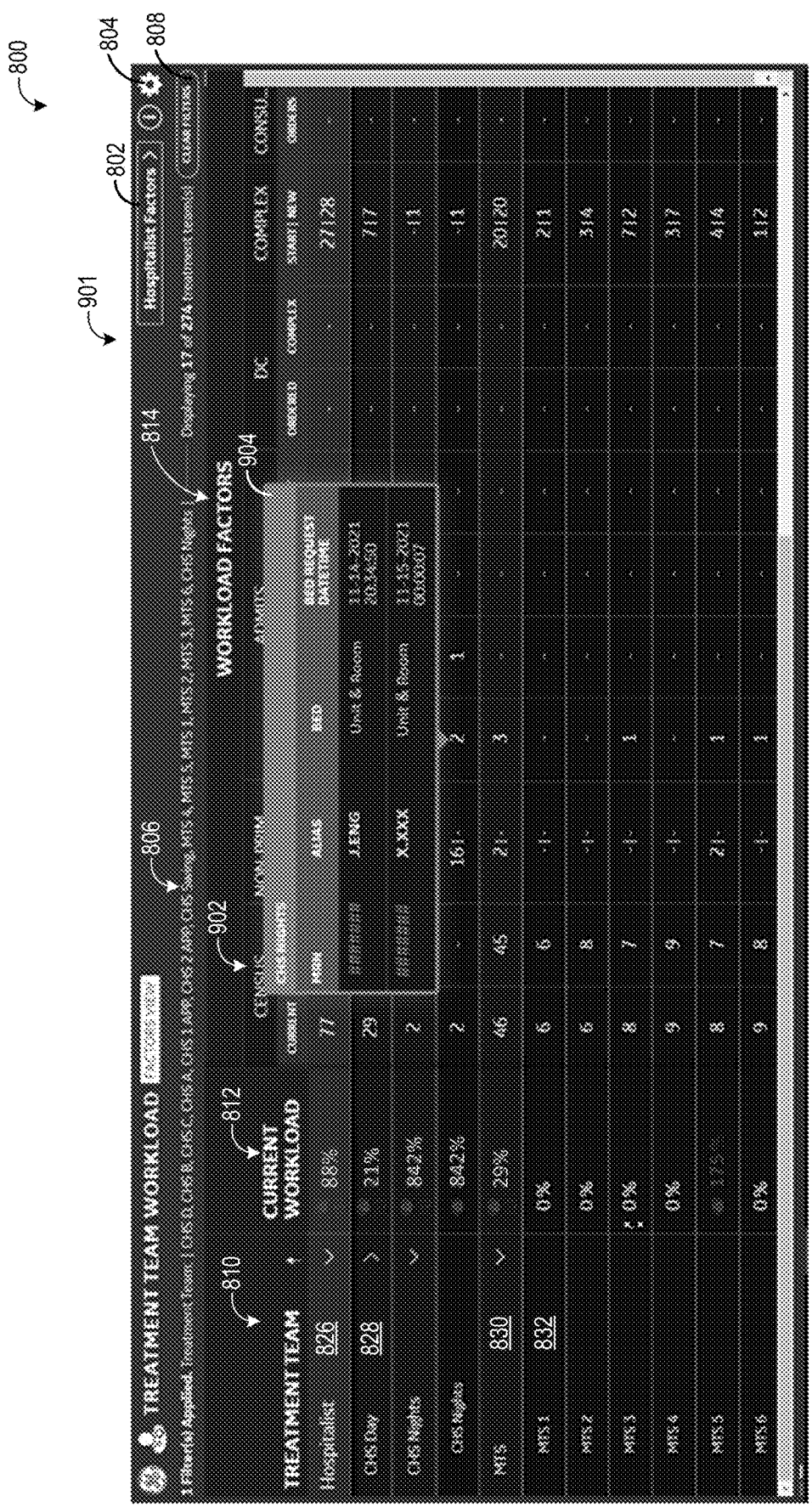
Figure 10:
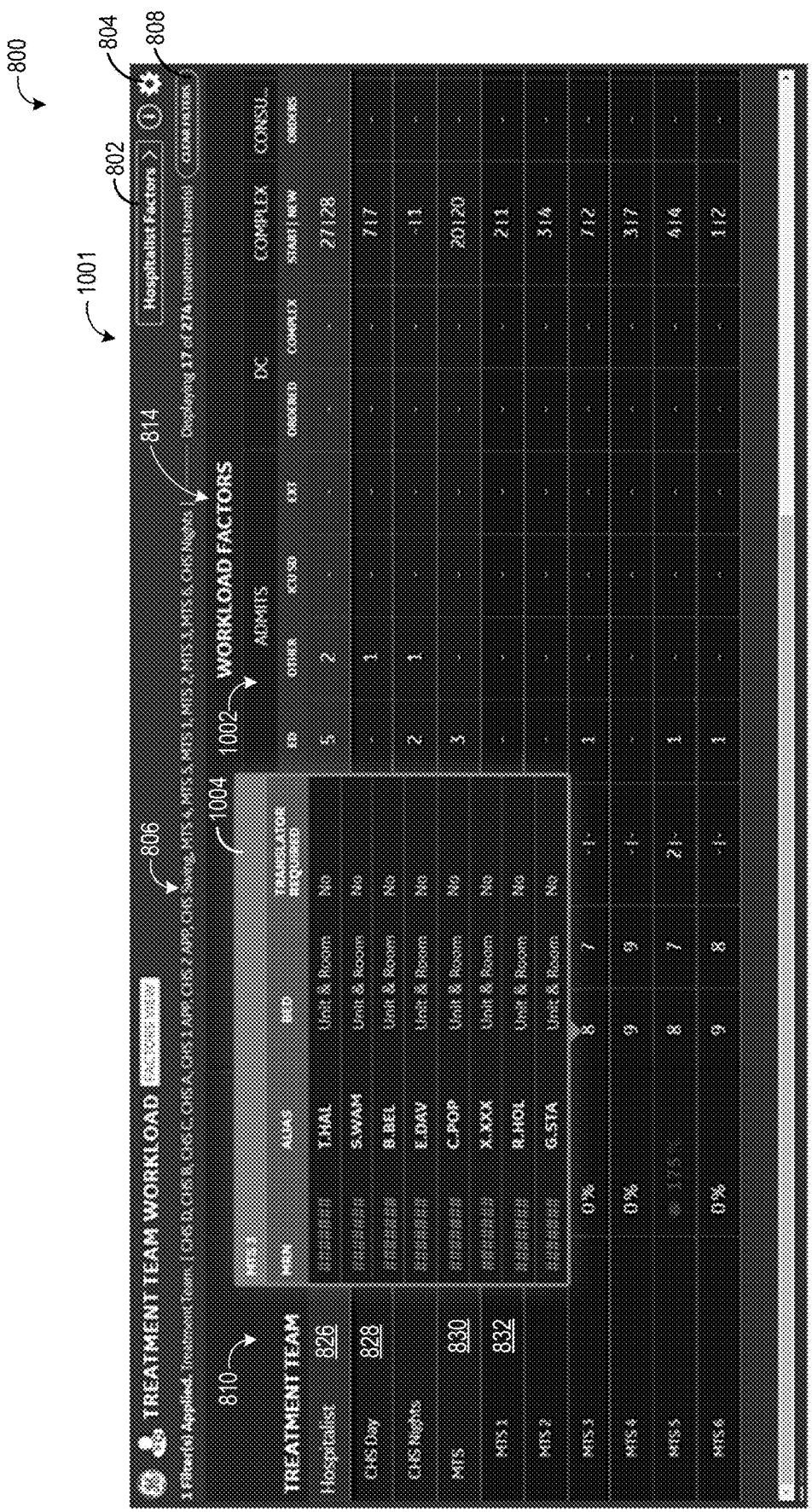

FIGS. 6-10 show various GUIs that may be displayed on a display device such as a display of client device 130 in order to interact with a workload demand system such as workload demand server system 102 of FIG. 1, workload demand server 202, or the like. FIGS. 6 and 7 show a first example workload GUI 600, where the data displayed via the workload GUI 600 is filtered by a first filtering factor. FIGS. 8-10 show a second example workload GUI 800, where the data displayed via the workload GUI 800 is filtered by a second filtering factor. GUIs 600 and 800 may be displayed in response to a user request to display the GUI. For example, a user may launch one or more GUIs by selecting suitable application icons displayed on the display. When the GUIs 600 and 800 launch, the user may be authenticated via a suitable authentication method, such as via a password, facial recognition, fingerprint recognition, etc.

GUIs 600 and 800 may be used to display past, current, and predicted workload demands for one or more care teams across a hospital unit and/or an entire hospital or hospital network. Thus, an operator such as a care team manager or healthcare administrator may use GUIs 600 and 800 to view care team workload demands in order to schedule staff, transfer patients, or perform other tasks in an optimal manner to achieve the best possible patient outcomes across the medical facility. GUIs 600 and 800 may be used to display one or more dashboards with care team or medical facility-specific information, such as dashboard 104 of workload management system 100.

Referring first to FIG. 6, workload GUI 600 displays workload data for a medical facility filtered to show data specific to a particular type of clinician, herein data specific to clinicians working in intensive care units (ICUs), as indicated by the factors selection element 602. GUI 600 may include a plurality of different workload scores for a respective plurality of care teams, which may be displayed in rows of GUI 600. The care teams displayed in GUI 600 may be selected from among a larger plurality of care teams via the input to the factors selection element 602 and/or via one or more filters that may be selected, for example, via controls accessible via a settings button 604. A summary of one or more filters applied may be displayed in a filter bar 606, and a user may clear the one or more filters via a clear filters button 608 included in the filter bar 606.

GUI 600 may include a plurality of columns showing workload data for each care team. For example, GUI 600 includes a team column 610, which identifies each care team (also referred to herein as treatment teams). GUI 600 further includes a workload score column 612, which displays the workload score (e.g., "current workload") for each care team. The workload scores presented in the workload score column 612 may be calculated with a workload score model, such as the workload score model of FIG. 3, according to the method described above with respect to FIG. 4.

GUI 600 further includes additional visual elements related to the workload scores, such as a plurality of workload factors columns 614, which may provide additional information on the factors/events resulting in the workload score for each care team. As shown, the plurality of workload factors columns 614 includes a census column 616 (displaying the total number of patients being attended to by each care team), a high acuity column 618, a medium acuity column 620, a low acuity column 622, and a procedures column 624. The high acuity column 618, medium acuity column 620, low acuity column 622 may display the number of patients that are classified as high acuity, medium acuity, and low acuity, respectively, for each care team. Each patient may be classified as high, medium, or low acuity as explained above with respect to FIG. 5. The procedures column 624 may indicate how many patients for each care team have procedures currently in process and/or scheduled for the current shift.

The care teams may be organized by classification. For example, the care teams shown in column 610 may include an ECMO classification, shown in row 626, and an intensivist classification, shown in row 628. Each classification may include one or more care teams that may be viewed individually by selecting an arrow associated with the classification. For example, the intensivist classification has been selected (e.g., the arrow in row 628 has been moved to a downward pointing position), which results in the different medical facility units classified as belonging to the intensivist classification being displayed (herein, the different ICUs at the medical facility). Each medical facility unit may include one or more care teams. For example, the CVICU, shown in row 630, may include two care teams, CVICU 1 (as shown in row 632) and CVICU 2.

In this way, the workload score and workload factors may be displayed for each care team and for each medical facility unit, as well as for all clinicians of a selected clinician category. For example, the intensivist category (e.g., row 628) shows the current workload score (e.g., 0%), patient census (e.g., 59), high acuity patients (e.g., 16 at the start of the shift and 5 new), medium acuity patients (e.g., 19 at the start of the shift and 7 new), and low acuity patients (e.g., 34), as well as total number of procedures scheduled (e.g., 5), for all intensivists during the current shift. The CVICU medical facility unit (e.g., row 630) shows the current workload score (e.g., 0%), patient census (e.g., 17), high acuity patients (e.g., 3 at the start of the shift), medium acuity patients (e.g., 3 at the start of the shift), and low acuity patients (e.g., 12), as well as total number of procedures scheduled (e.g., 0), for all intensivists of the CVICU during the current shift. Similar information may be displayed for each care team, e.g., the CVICU 1 care team as shown in row 632.

In the example shown in FIG. 6, the workload scores are presented as summary views, which may be the current/instantaneous workload score values. In some examples, a user may select to view the workload scores as graph views, which may show the workload scores over time throughout the shift. For example, the user may adjust the settings of the GUI to show the workload scores as graph views, or may select an individual workload score to view the selected workload score as a graph view.

When desired, a user may view additional information via select user input. For example, FIG. 6 shows a first view 601 of the GUI 600 where an example first display panel 634 is displayed on or to the side of GUI 600 in response to a user input to one of the rows and columns of the GUI 600. For example, the user may hover over the procedures column 624 for the NSICU (which may indicate that one procedure is scheduled for the NSICU that shift). As a result, the display panel 634 may be displayed, which may provide additional information about the scheduled procedure, such as the patient the procedure is being performed on, the bed the patient is currently assigned to (unit and room), the procedure type, and the timestamp for the procedure (e.g., when the procedure is scheduled to occur).

FIG. 7 shows a second view 701 of the GUI 600 where an example second display panel 702 is displayed on or to the side of GUI 600 in response to a user input to one of the rows and columns of the GUI 600. For example, the user may hover over the medium acuity column 620 for the CVICU 2 care team (which may indicate that 3 medium acuity patients are being treated by the CVICU 2 care team). As a result, the display panel 702 may be displayed, which may provide additional information about the medium patients being treated by the selected care team, such as the patient names/medical record numbers, the beds the patients are currently assigned to (unit and room), the timestamp, and the sub-factors contributing the calculated acuity score (e.g., pulmonary, cardiac, renal, etc.).

Referring next to FIG. 8, workload GUI 800 displays workload data for a medical facility filtered to show data specific to a particular type of clinician, herein data specific to hospitalists, as indicated by the factors selection element 802. GUI 800 may include a plurality of different workload scores for a respective plurality of care teams, which may be displayed in rows of GUI 800. The care teams displayed in GUI 800 may be selected from among a larger plurality of care teams via the input to the factors selection element 802 and/or via one or more filters that may be selected, for example, via controls accessible via a settings button 804. A summary of one or more filters applied may be displayed in a filter bar 806, and a user may clear the one or more filters via a clear filters button 808 included in the filter bar 806. In some examples, GUI 800 may be reached from GUI 600 (and vice versa) by changing the selected factors from the factors selection element and/or by adjusting the filtering.

GUI 800 may include a plurality of columns showing workload data for each care team. For example, GUI 800 includes a team column 810, which identifies each care team (also referred to herein as treatment teams). GUI 800 further includes a workload score column 812, which displays the workload score (e.g., "current workload") for each care team. The workload scores presented in the workload score column 812 may be calculated with a workload score model, such as the workload score model of FIG. 3, according to the method described above with respect to FIG. 4.

GUI 800 further includes a plurality of workload factors columns 814, which may provide additional information on the factors/events resulting in the workload score for each care team. In the example presented herein, more workload factors are available to view than can be seen on the available display space, and thus different workload factor columns may be viewed by adjusting the scroll bar at the bottom of the GUI 800. FIG. 8 shows a first view 801 of GUI 800 with a first subset of workload factor columns shown. FIG. 9 shows a second view 901 of GUI 800 with a second subset of workload factor columns shown. FIG. 10 shows a third view 1001 of GUI 800 with a third subset of workload factor columns shown.

Accordingly, the plurality of workload factors columns 814 may include a DC column 816 (which may include discharges ordered and complex discharges columns), a complex patients column 818, a consensus column 820, a behavioral patients column, a scatter patients column, a medium deterioration score patients column 822, a high deterioration score patients column, a code column, a census column 902 (shown in FIG. 9), a non-primary column, and an admits column 1002 (which, as shown in FIG. 10, may include admissions to the ED, ICU, and other units), as examples. Other workload factor columns may be displayed without departing from the scope of this disclosure.

Similar to GUI 600, the care teams may be organized by unit. Each unit may include one or more care teams that may be viewed individually by selecting an arrow associated with the classification. For example, a hospitalist classification has been selected (e.g., the arrow in row 826 has been moved to a downward pointing position), which results in the different medical facility units classified as belonging to the hospitalist classification being displayed (herein, the different non-ICU units at the medical facility), such as a CHS day unit (shown in row 828) and an MTS unit (shown in row 830). Each medical facility unit may include one or more care teams. For example, the MTS unit, shown in row 830, may include a plurality of care teams, such as MTS 1, shown in row 832.

In this way, the workload score and workload factors may be displayed for each care team and for each medical facility unit, as well as for all clinicians of a selected clinician category. For example, the hospitalist category (e.g., row 826) shows the current workload score (e.g., 88%) for all hospitalists at the medical facility. Further, the hospitalist category shows the various workload factors (e.g., determined by the event data) contributing to the workload score, such as patient census (e.g., 77 total patients) and the number of complex patients (e.g., 27 at the start of the shift and 28 new), for all hospitalists during the current shift. The MTS medical facility unit (e.g., row 830) shows the current workload score (e.g., 29%) and various workload factors such as patient census (e.g., 46) and the number of complex patients (e.g., 20 at the start and 20 new), for all hospitalists of the MTS during the current shift. Similar information may be displayed for each care team, e.g., the MTS 1 care team as shown in row 832.

In the example shown in FIG. 8, the workload scores are presented as summary views, which may be the current/instantaneous workload score values. In some examples, a user may select to view the workload scores as graph views, which may show the workload scores over time throughout the shift. For example, the user may adjust the settings of the GUI to show the workload scores as graph views, or may select an individual workload score to view the selected workload score as a graph view.

As shown in GUI 800, the workload scores may vary across care teams, which may highlight unbalanced staffing or patient admittance across care teams. For example, while the MTS unit as a whole may have a manageable workload, one of the care teams (e.g., MTS 5) may have a significantly higher workload score than the other care teams of the MTS unit. Likewise, the CHS night unit/care team may have a higher workload score than the CHS day unit/care team. In some examples, when a care team has a workload score that is greater than a threshold, that workload score may be highlighted in a different color (e.g., red) than the other workload scores to draw attention to the high workload demand on that care team. Further, alert icons may be displayed in the GUI, which may be selectable to view additional information about the high workload scores. Further still, by including the workload factors that contributed to the workload score in the GUI 800, the factors/events leading to the workload scores may be compared across care teams, which may allow a user to make decisions about staff scheduling, patient transfers, and the like, to rebalance workloads.

When desired, a user may view additional information via select user input. For example, FIG. 8 shows an example first display panel 840 that may be displayed on or to the side of GUI 800 in response to a user input to one of the rows and columns of the GUI 800. For example, the user may hover over one of the values in the medium deterioration score patients column 822 for the MTS 1 care team (which may indicate that one new patient is going to be or has been admitted). As a result, the display panel 840 may be displayed, which may provide additional information about the patient, such as the patient name/MRN, the bed the patient is currently assigned to (unit and room), and the patient deterioration score.

FIG. 9 shows a second view 901 of the GUI 800 where an example second display panel 904 is displayed on or to the side of GUI 800 in response to a user input to one of the rows and columns of the GUI 800. For example, the user may hover over the ED sub-column of the admits column 1002 for the CHS nights care team (which may indicate that 2 patients are scheduled to be admitted to the CHS unit from the ED). As a result, the display panel 904 may be displayed, which may provide additional information about the patients being admitted and to be treated by the care team, such as the patient names/medical record numbers, the beds the patients are currently assigned to (unit and room), the timestamp, and the time and date each patient/bed admission was requested.

FIG. 10 shows a third view 1001 of the GUI 800 where an example third display panel 1004 is displayed on or to the side of GUI 800 in response to a user input to one of the rows and columns of the GUI 800. For example, the user may hover over the census column 902 for the MTS 8 care team (which may indicate that 8 patients are being treated by the care team). As a result, the display panel 1004 may be displayed, which may provide additional information about the patients being treated by the care team, such as the patient names/medical record numbers, the beds the patients are currently assigned to (unit and room), and whether or not a translator is needed for each patient.

The systems, methods, and graphical user interfaces provided herein may improve workload balancing in healthcare settings, particularly during high-demand situations where time is limited, such as during infectious disease outbreaks where patient demand of resources may change exponentially and data obtained one day may not be applicable the next day. By establishing a system that automatically receives staffing and event data from a medical facility in real time or near real time, aggregates that information to calculate a minute-by-minute workload score, and continually updates workload dashboards as data is received, where the dashboards can be rendered as the GUIs described herein, the approach of the disclosure allows managers or administrators to make informed decisions about critical healthcare questions, such as when to transfer patients and where to transfer the patients, and when to adjust clinician schedules, thereby improving patient care and reducing clinician burnout.

In contrast, in prior systems, the decision of when to schedule staff, send staff home, transfer patients, or accept transferred patients, may be based on old data or manager experience, and thus staff scheduling and patient transfers or admissions may vary across care teams or be insufficient for current patient demands. The described workload management system/GUIs solves this problem by providing a specific, dynamically updating list of workload scores for each care team of an entire medical facility, along with factors contributing to each workload score. In this way, the workload management system and generated GUIs provides an improvement to the capability of the healthcare system as a whole. The disclosure provides a specific way of improving the capability of the healthcare system, by providing one or more workload GUIs that display dynamically updating workload score and factors lists. The disclosure further provides a specific improvement to the way computers operate by aggregating workload demand information (e.g., staffing data and event data) for multiple separate care teams and medical facility units in one location and updating the workload demand information in real-time, which may obviate the need for users to have to navigate through multiple different data files, manually update information as clinician workload changes, and so forth, thereby increasing the efficiency of the operation of the computer for the user.

The workload GUIs described herein provide a specific manner of displaying a limited set of information to a user (workload demand information, such as workload scores and factors contributing to the workload scores), rather than using conventional user interface methods to display a generic index on a computer, requiring the user to step through many layers of menu options to reach the desired data, or burying the desired data within all hospital data. Thus, the user experience with the computer may be improved and made more efficient.

In this way, a computing device configured to generate and/or display the workload GUIs described herein (e.g., the workload demand server) provides a specific manner of displaying a limited set of information (e.g., the workload scores and relevant workload factors) to the user, rather than using conventional user interface methods to display a generic index/list on a computer that may require the user to step through multiple menus and/or lists of staff schedules and patient status (e.g., census, admissions, discharges, transfers, patient conditions, etc.) to find the relevant information needed to evaluate current care team workload demands. The workload scores and workload GUIs disclosed herein may be advantageous because it avoids a user having to scroll around and switch views multiple times to find desired data/functionality, thereby preventing drilling down through many layers to get the desired data/functionality which may be slow, complex, and difficult to learn. The disclosed workload scores and workload GUIs may improve the efficiency of using the computing device by bringing together the portion of the workload data/information most relevant to the user (e.g., the workload score and contributing factors/events, which may be sourced from one or more EMR systems and displayed on the workload GUI and/or as display panels on the workload GUI) and the dashboard actually displaying the care team workload demands, allowing the user to view the most relevant information on the workload GUIs without actually opening up the one or more EMR systems. The speed of a user's navigation through various views and windows may be improved because the disclosed workload GUI and associated display panels saves the user from navigating to an EMR interface, opening the EMR interface up, and then navigating within the EMR interface to enable the information of interest to be seen (e.g., the factors contributing to the workload) or a function of interest to be activated. For example, the workload GUIs may be displayed with the one or more EMR systems (e.g., an interface via which the EMR systems can be accessed) are in an un-launched state, e.g., when the EMR interface is not activated or currently running, which may allow clinicians or managers to make decisions about care team workloads without logging into/accessing the one or more EMR systems.

Furthermore, by displaying a limited set of information via the workload GUIs as described herein, operation of the computing device(s) that collect and render the data for display may be improved by reducing the processing demands of the computing device(s), thereby increasing the efficiency of the computing device(s). For example, only certain workload score factors may be displayed, which results in a limited amount of the data that is received being processed, which may improve the efficiency of the computing device(s). Further, because the data is processed in real time and updates to the workload GUIs are made continuously as data is received, undue processing lags that may occur if updates were made at predefined discrete time points may be reduced, which may improve the efficiency of the computing device(s).

The embodiments described herein may allow for the retrieval/receipt of various types of data from disparate locations and systems (e.g., various EMR systems, hospital operational systems) and processing of the data to populate the workload GUIs as described herein in real time or near real time. The systems described herein may be configured to continue to update the workload GUIs even if a hospital or network experiences a lag in data collection or reporting, or if data is otherwise unexpectedly unavailable for a given care team for a period of time. For example, data from other care teams may continue to be reported even if data from a given care team is not available. Further, in some examples, the systems described herein may use prior data from a given care team to project workload demand and report the projected workload demand via the workload GUIs when current workload demand information is not available for that care team. In doing so, real time reporting of data may be maintained.

The technical effect of presenting workload demand information for a hospital via a GUI as described herein is that health care providers, managers, or administrators may quickly make decisions about transfer of patients, clinician staffing, etc., so that patient care may be improved. Further, the simplicity of use, intuitiveness, and scalability facilitates rapid deployment across hospital networks of any size.

The disclosure also provides support for a method for determining a workload demand of a medical facility, comprising: automatically determining a workload score for a care team including plurality of clinicians over a shift based on shift data and event data received from the medical facility, including calculating a cumulative workload over the shift based on the event data and a workload reduction over time based on the shift data, generating a graphical workload score tile including a visual representation of the workload score, arranging the graphical workload score tile in a workload graphical user interface (GUI), and displaying the GUI on a display device. In a first example of the method, the shift data comprises a number and/or type of clinicians of the care team scheduled to work over the shift. In a second example of the method, optionally including the first example, the event data includes current and/or predicted events or factors that contribute to a workload of the care team. In a third example of the method, optionally including one or both of the first and second examples, the current and/or predicted events or factors include one or more of a number of patients being treated by the care team, a complexity of care for each patient being treated by the care team, scheduled patient admissions, scheduled patient discharges, a deterioration score for each patient, and procedures scheduled or occurring during the shift. In a fourth example of the method, optionally including one or more or each of the first through third examples, each current and/or predicted event or factor is associated with a length of time, and wherein the cumulative workload comprises a summation of each length of time. In a fifth example of the method, optionally including one or more or each of the first through fourth examples, the method further comprises: calculating a patient acuity score based on one or more of the current and/or predicted events or factors, and wherein the calculated patient acuity score is associated with a length of time. In a sixth example of the method, optionally including one or more or each of the first through fifth examples, the workload reduction over time is calculated by subtracting an expected workload performed per minute by the care team from the cumulative workload. In a seventh example of the method, optionally including one or more or each of the first through sixth examples, automatically determining the workload score comprises normalizing the workload reduction over time based on a time remaining in the shift.

The disclosure also provides support for a workload demand system, comprising: one or more processors, and memory storing instructions executable by the one or more processors to: receive, at the workload demand system, a feed from an electronic medical record system of a medical facility, where shift data indicating schedules for one or more clinicians of a care team of the medical facility over a current shift and event data indicating events that impact the care team's workload over the current shift are sent over the feed, output, for display on a display device, a workload graphical user interface (GUI) that includes a workload score tile indicating a current ability of the care team to meet a workload demand, where a workload score displayed in the workload score tile is generated by calculating the workload demand from the event data obtained from the feed and reducing the workload demand based on an expected output of the care team as determined from the shift data obtained from the feed, and display, on the workload GUI, additional visual elements indicating one or more contributing factors to the workload score. In a first example of the system, the event data includes one or more of a number of patients being treated by the care team, a complexity of care for each patient being treated by the care team, scheduled patient admissions, scheduled patient discharges, an acuity score for each patient being treated by the care team, a deterioration score for each patient being treated by the care team, and procedures to be performed by the care team scheduled or occurring during the shift. In a second example of the system, optionally including the first example, the care team is a first care team and the workload score tile is a first workload score tile, and wherein the workload GUI further includes a plurality of additional workload score tiles each indicating a current ability of a respective care team of a plurality of additional care teams to meet a workload demand for that care team. In a third example of the system, optionally including one or both of the first and second examples, the additional visual elements indicate one or more of a number of patients being treated by the care team, a complexity of care for each patient being treated by the care team, scheduled patient admissions, scheduled patient discharges, an acuity score for each patient being treated by the care team, a deterioration score for each patient being treated by the care team, and procedures to be performed by the care team scheduled or occurring during the shift. In a fourth example of the system, optionally including one or more or each of the first through third examples, the instructions are further executable to display one or more display panels in response to user input to the workload GUI, the one or more display panels configured to display additional information about selected patients being treated by the care team.

The disclosure also provides support for a method for a workload management system, comprising: displaying a menu listing one or more options for retrieving data of one or more patients from a plurality of databases and systems of a hospital, the plurality of databases and systems including one or more electronic medical record (EMR) systems, and display a workload graphical user interface (GUI) that displays, for each care team of the hospital, a workload score indicating a current ability of that care team to meet a workload demand, the workload GUI being selectable to launch a first display panel with additional information and/or controls relating to the workload score, and the workload GUI further including a limited set of additional visual elements that are selectable to launch a second display panel, wherein the workload GUI is displayed while the one or more EMR systems are in an un-launched state. In a first example of the method, the limited set of additional visual elements indicate one or more factors contributing to each workload score. In a second example of the method, optionally including the first example for a given care team, the one or more factors include one or more of a number of patients being treated by the care team, a complexity of care for each patient being treated by the care team, scheduled patient admissions, scheduled patient discharges, an acuity score for each patient being treated by the care team, a deterioration score for each patient being treated by the care team, and procedures to be performed by the care team scheduled or occurring during the shift. In a third example of the method, optionally including one or both of the first and second examples, the second display panel is displayed in response to user selection of a visual element indicating a deterioration score for each patient being treated by the care team, and wherein the second display panel is configured to display an identifier of each patient and that patient's deterioration score. In a fourth example of the method, optionally including one or more or each of the first through third examples, the second display panel is displayed in response to user selection of a visual element indicating procedures to be performed by the care team scheduled or occurring during the shift, and wherein the second display panel is configured to display an identifier of each patient undergoing a procedure and a description of each procedure. In a fifth example of the method, optionally including one or more or each of the first through fourth examples, the second display panel is displayed in response to user selection of a visual element indicating a number of patients to be admitted, and wherein the second display panel is configured to display an identifier of each patient to be admitted and a date and time at which each admission request was entered. In a sixth example of the method, optionally including one or more or each of the first through fifth examples, each workload score is displayed on the workload GUI in a summary view, and wherein the first display panel is configured to display a graph view of a selected workload score.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for determining a workload demand of a medical facility, the method executable by a computing device and comprising:
automatically determining a workload score for a care team including plurality of clinicians over a shift based on shift data and event data received from an electronic medical record (EMR) system of the medical facility, the workload score being a dynamically-updating score generated based on a cumulative workload over the shift calculated based on the event data, a workload reduction over time calculated based on the shift data, and a remaining time left in the shift;
generating a graphical workload score tile including a visual representation of the workload score;
arranging the graphical workload score tile in a workload graphical user interface (GUI); and
displaying the workload GUI on a display device, wherein the workload GUI is selectable to launch a first display panel with additional information and/or controls relating to the workload score, and the workload GUI further includes a limited set of additional visual elements that are selectable to launch a second display panel, wherein the limited set of additional visual elements indicate one or more factors contributing to the workload score, and wherein the workload GUI is displayed while the EMR system is in an un-launched state.

2. The method of claim 1, wherein the shift data comprises a number and/or type of clinicians of the care team scheduled to work at each hour or minute of the shift.

3. The method of claim 1, wherein the event data includes current and/or predicted events or factors that contribute to a workload of the care team.

4. The method of claim 3, wherein the current and/or predicted events or factors include one or more of a number of patients being treated by the care team, a complexity of care for each patient being treated by the care team, scheduled patient admissions, scheduled patient discharges, a deterioration score for each patient, and procedures scheduled or occurring during the shift.

5. The method of claim 3, wherein each current and/or predicted event or factor is associated with a length of time, and wherein the cumulative workload comprises a summation of each length of time.

6. The method of claim 5, further comprising calculating a patient acuity score based on one or more of the current and/or predicted events or factors, and wherein the calculated patient acuity score is associated with a length of time.

7. The method of claim 1, wherein the workload reduction over time is calculated by subtracting an expected workload performed per minute by the care team from the cumulative workload.

8. The method of claim 7, wherein automatically determining the workload score comprises normalizing the workload reduction over time based on the time remaining in the shift.

9. A workload demand system, comprising:
one or more processors; and
memory storing instructions executable by the one or more processors to:
receive, at the workload demand system, a feed from an electronic medical record (EMR) system of a medical facility, where shift data indicating schedules for one or more clinicians of a care team of the medical facility over a current shift and event data indicating events that impact the care team's workload over the current shift are sent over the feed;
output, for display on a display device, a workload graphical user interface (GUI) that includes a workload score tile indicating a current ability of the care team to meet a workload demand over the current shift, the workload score tile including a dynamically-updating workload score displayed in the workload score tile, wherein the workload score is updated by calculating the workload demand over the current shift from the event data obtained from the feed, reducing the workload demand over the current shift based on an expected output of the care team over the current shift as determined from the shift data obtained from the feed, and dividing the reduced workload demand over the current shift by a time remaining in the current shift; and
display, on the workload GUI, a limited set of additional visual elements indicating one or more contributing factors to the workload score, wherein the workload GUI is selectable to launch a first display panel with additional information and/or controls relating to the workload score, and the limited set of additional visual elements are selectable to launch a second display panel, wherein the workload GUI is displayed while the EMR system is in an un-launched state.

10. The system of claim 9, wherein the event data includes one or more of a number of patients being treated by the care team, a complexity of care for each patient being treated by the care team, scheduled patient admissions, scheduled patient discharges, an acuity score for each patient being treated by the care team, a deterioration score for each patient being treated by the care team, and procedures to be performed by the care team scheduled or occurring during the shift, and wherein calculating the workload demand comprises identifying a plurality of events from the event data, assigning a workload in minutes and an event time to each event, and adding each event workload in minutes to a running workload calculator at an associated event time and every point onward from the associated event time in the current shift.

11. The system of claim 9, wherein the care team is a first care team and the workload score tile is a first workload score tile, and wherein the workload GUI further includes a plurality of additional workload score tiles each indicating a current ability of a respective care team of a plurality of additional care teams to meet a workload demand for that care team.

12. The system of claim 9, wherein the additional visual elements indicate one or more of a number of patients being treated by the care team, a complexity of care for each patient being treated by the care team, scheduled patient admissions, scheduled patient discharges, an acuity score for each patient being treated by the care team, a deterioration score for each patient being treated by the care team, and procedures to be performed by the care team scheduled or occurring during the shift.

13. The system of claim 12, wherein the first display panel is configured to display a graph view of the workload score, the graph view including a plot of the workload score over time.

14. A method for a workload management system, comprising:
displaying a menu listing one or more options for retrieving data of one or more patients from a plurality of databases and systems of a hospital, the plurality of databases and systems including one or more electronic medical record (EMR) systems, and
displaying a workload graphical user interface (GUI) that displays, for each care team of the hospital, a workload score indicating a current ability of that care team to meet a workload demand, each workload score generated based on a respective cumulative workload for that care team over a shift calculated based on event data received from the one or more EMR systems, a respective workload reduction over time for that care team calculated based on shift data, and a remaining time left in the shift, the workload GUI being selectable to launch a first display panel with additional information and/or controls relating to the workload score, and the workload GUI further including a limited set of additional visual elements that are selectable to launch a second display panel, wherein the workload GUI is displayed while the one or more EMR systems are in an un-launched state.

15. The method of claim 14, wherein the limited set of additional visual elements indicate one or more factors contributing to each workload score.

16. The method of claim 15, wherein, for a given care team, the one or more factors include one or more of a number of patients being treated by the care team, a complexity of care for each patient being treated by the care team, scheduled patient admissions, scheduled patient discharges, an acuity score for each patient being treated by the care team, a deterioration score for each patient being treated by the care team, and procedures to be performed by the care team scheduled or occurring during the shift.

17. The method of claim 16, wherein the second display panel is displayed in response to user selection of a visual element indicating a deterioration score for each patient being treated by the care team, and wherein the second display panel is configured to display an identifier of each patient and that patient's deterioration score.

18. The method of claim 16, wherein the second display panel is displayed in response to user selection of a visual element indicating procedures to be performed by the care team scheduled or occurring during the shift, and wherein the second display panel is configured to display an identifier of each patient undergoing a procedure and a description of each procedure.

19. The method of claim 16, wherein the second display panel is displayed in response to user selection of a visual element indicating a number of patients to be admitted, and wherein the second display panel is configured to display an identifier of each patient to be admitted and a date and time at which each admission request was entered.

20. The method of claim 16, wherein each workload score is displayed on the workload GUI in a summary view, and wherein the first display panel is configured to display a graph view of a selected workload score.

* * * * *